No. 756,616. Patented April 5, 1904.

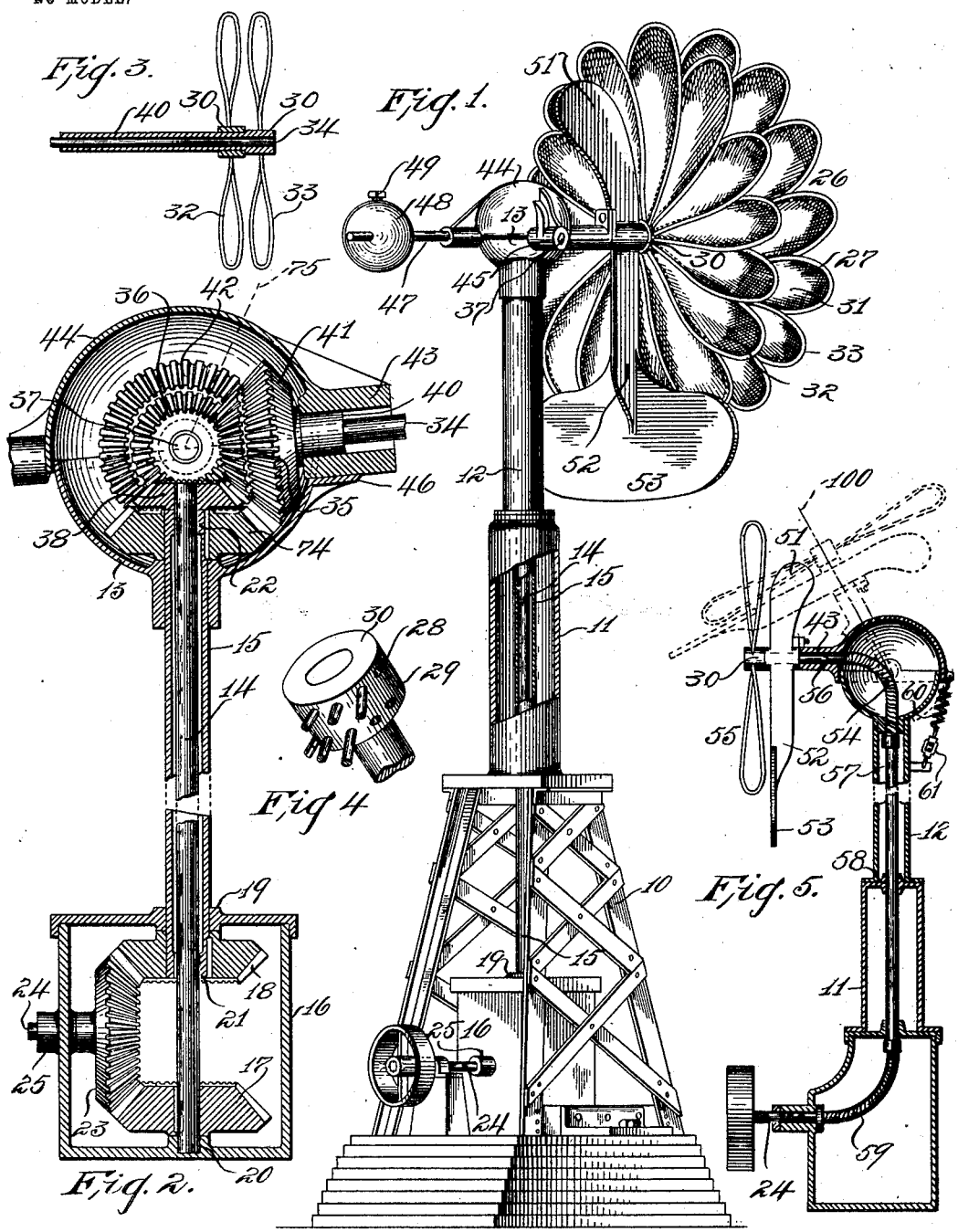

UNITED STATES PATENT OFFICE.

ALFRED FORNANDER, OF NEW YORK, N. Y., ASSIGNOR OF ONE-HALF TO ANTHONY SCHULTE, OF NEW YORK, N. Y.

WINDMILL.

SPECIFICATION forming part of Letters Patent No. 756,616, dated April 5, 1904.

Application filed September 15, 1903. Serial No. 173,242. (No model.)

*To all whom it may concern:*

Be it known that I, ALFRED FORNANDER, a subject of the King of Sweden and Norway, residing in New York, in the county of New York and State of New York, have invented certain new and useful Improvements in Windmills, of which the following is a specification.

This invention relates to and has for an object to provide an efficient and automatically-governed windmill.

In windmills as frequently constructed there is provided a wind-wheel which will take the wind when interposed in its path of movement, and a vane is provided upon the side of the wind-wheel opposite to that at which it is impinged upon by the wind to keep the wheel in the wind, and when the wind blows at a violent rate there has frequently been provided some means for varying the transmission of speed from the wheel to the point of application of power, which means, however, is in many instances unsatisfactory and not sufficiently quick, also when it was desired to run the windmill in a heavy gale of wind great weight and strain was placed upon the wheel and the sails or blades thereof, and other expedients more or less cumbrous have been resorted to for the regulation of windmills. The present improvement, however, is intended to overcome the difficulties heretofore encountered, and in the drawings accompanying and forming part of this specification a form of my invention is illustrated, wherein—

Figure 1 is a perspective of a windmill embodying the present improvements. Fig. 2 is a detail longitudinal section, partially broken away, showing some of the movable parts of the device. Fig. 3 is a longitudinal section showing the arrangement of a double wheel, or rather two wheels. Fig. 4 is a detail in perspective of a hub; and Fig. 5 shows a windmill provided with a flexible coupling instead of pinions, as illustrated in Fig. 2.

To overcome the objectionable feature of having the sails of a windmill receive the full force of a gust of wind, I provide means whereby the sails may be moved into a plane at an angle to the direction of the wind instead of receiving it at a plane transverse to its direction, the angle increasing in acuteness with the increase of velocity of the wind and the acuteness of the angle varying with the variation of the velocity.

As illustrated in the drawings, a standard or framework 10 is shown, and which framework embodies a portion 11 in the nature of a housing, carrying in turn a portion 12 in the nature of a housing and which is free to turn thereon and carries a gear-housing 13. There are shown within the housing portions of the standard 11 and 12 a shaft 14 and a hollow shaft 15 surrounding the same, which shafts enter a housing 16, in the present instance located at the lower portion of the standard, and terminate, respectively, in bevel-gears 17 and 18, the top of the housing 16 having a bearing 19 for the shaft 15, and the shaft 14 is shown as stepped into a bearing 20 at the bottom thereof. The shaft 15 has bearings 21 and 22 at its lower and upper ends, respectively, for the shaft 14. The gear-wheels 17 and 18 are in mesh with a bevel gear-wheel 23, fast upon a driving-shaft 24, mounted in a bearing 25 in the side of the housing 16.

The sails, as illustrated herein and designated in a general way by 26, are shown as each comprising a frame 27, bent into shape and having its ends enter two rows of holes 28 and 29 in a hub 30. The ends of the frame of each sail will enter a hole in each of said series, which will give a slant to the sail, its body portion 31 being comprised of fabric secured to the frame. There are shown in Fig. 1 two sail-wheels organized to be driven by the wind in opposite directions. Such wheels are designated by 32 and 33 in Fig. 3 for the purpose of illustration. The wheel 33 is shown as having its hub 30 mounted upon a shaft 34, upon which is fast a bevel gear-wheel 35, in mesh with a bevel gear-wheel 36, loose upon a shaft 37, which is fast with gear-housing 13, which bevel-gear is in mesh with bevel gear-wheel 38, fast upon the shaft 14. The hub 30 of the wheel 32 is fast upon a hollow shaft 40, surrounding the shaft 34 and having fast upon it a bevel gear-wheel 41, in mesh with a bevel gear-wheel 42, loose upon the shaft 37 and in mesh with a bevel gear-wheel 74, fast upon the shaft 15. The action of the wind will cause the rotation of the wheels in opposite directions, and the shaft 24 will be driven by wheels 17 and 18, each one applying its force or energy thereto.

The shafts 34 and 40 are carried in a sleeve 43, rigid with a hood 44, which has hubs 45, embracing the shaft 37 and capable of turning upon an axis concentric with the axis of said shaft, such hood 44 constituting, with the housing 13, a complete housing for the gears. The lower part of the housing 13 carries a shelf or stop-arm 46 for limiting the downward movement of the sleeve 43. A rod 47 projects from the hood, and a weight 48 is shown as mounted thereon provided with a set-screw 49 for its adjustment. The sleeve 43 also carries a vane 51, in the present instance projecting upwardly from the normal position of such shaft. The vane is shown as continued at 52 below the sleeve and carries a blade or sail 53, the face of which occupies a plane normally transverse to the line in which the wind will act on the wheel with the greatest efficiency and parallel with the plane of rotation of the wheels. Thus it will be seen that when the wind blows on the wheels it will swing them around, so that it will pass the vanes 51 and 52, impinge the sails of the wheel 32, revolving it to the right, after the wind passes off of which sails it will engage the sails of the wheel 33 and cause such wheel to rotate toward the left at an equal speed in the present instance, whereby both the wheels through their gearing will act upon the driving-shaft 24. Such wheels are not dependent entirely upon the vane for holding them in the wind, but automatically balance themselves, so that they will stay more steadily in the wind than the wheels which have heretofore been made, controlled as they were by a vane on the other side of the sails from the wind.

Upon the wind becoming strong and impinging upon the blade or sail 53 it will raise the wheels—as, for instance, to the position shown by the dotted lines 75 in Fig. 2—so that they will rotate in a plane at an acute angle to the line of direction of the wind and will consequently place the sails at such an angle to the wind that it will not act upon the full face of the sails, but will only have a modified force thereon, whereby the velocity or force of the wind will automatically govern the windmill, so that undue speeding will not be had; but the parts will produce the same force and velocity or a maximum velocity and force at the shaft 24 irrespective of the velocity of the wind. The angle of the plane of the wheels will vary with the variation of the wind, and when its velocity becomes great the wheels will be placed in a position to withstand it better than when located transversely to its path.

It will be observed that the housing 13 will turn with the sleeve 43, so that at whatever point of the compass the wind comes from the parts will assume a proper working position, there being a universal coupling for these parts between the sleeve and the standard, and the gearing also constitutes a universal coupling between the shafts supporting the wind-wheels and the shafts geared to the driving-shaft. In Fig. 5, however, it has been shown how the device may be employed by the use of a flexible shaft 54, there being shown in the present instance but a single wind-wheel 55, having a shaft 56 in the sleeve 43, which shaft is connected by the flexible shaft 54 to a shaft 57, supported in bearings 58 in the housing 11 12, and a flexible shaft 59 connects the shaft 57 with the shaft 24. There can be flexible shafts applied to one or to both such points, as the case may demand. The dotted-line position 100 shows the wheel in a raised position, modifying the sail area presented to the wind. In place of the balancing-weights shown in the other instance a spring 60 is here employed and may be adjusted as to tension by a turnbuckle 61.

It will thus be seen that upon the wind coming up the wheel will be shifted around to the proper position or a position transverse to the line of the wind, and the weight 43 having been adjusted so that the parts freely balance when upon the increase in the velocity in the wind the wheels will be shifted out of their normal plane, so that the sails will receive a less amount of force from the wind, and consequently produce less power, so that variations in power or speeding will not be had. The connection between the wheel-shaft and the connecting-shaft permits the movement of such parts up and down, and a universal coupling between the standard and the housing permits rotation and such universal movement without interfering with the gear or its action.

Having thus described my invention, I claim—

1. In a windmill, the combination with a standard; of a shaft carried thereby; an arm; a universal joint uniting the standard and the arm; a shaft in the arm; a wind-wheel thereon; and a universal coupling between said shafts.

2. In a windmill, the combination with a standard; of a shaft carried thereby; an arm; a universal joint uniting the standard and the arm; a shaft in the arm; a wind-wheel thereon; a universal coupling between said shafts; and a blade carried by and below the arm and having its face in a plane transverse to the line in which the wind will act on the wheel with the greatest efficiency.

3. In a windmill, the combination with a standard, of an arm having a universal connection therewith; a pair of shafts within the arm; a wind-wheel having sails upon each of said shafts; said sails on the respective wheels having reverse slant; a pair of shafts within the standard; gearing connecting the respective shafts; and a shaft driven thereby.

4. In a windmill, the combination with a standard; of an arm having a universal connection therewith; a pair of shafts within the arm; a wind-wheel upon each shaft and organized for reverse rotation by the wind; a pair of shafts within the standard; gearing connecting the respective shafts; and a driving-shaft controlled thereby.

5. In a windmill, the combination with a a wind-wheel; of an arm to carry the same and movable upon a vertical axis and a horizontal axis; a vane to turn the arm on its vertical axis to hold the same in the wind and carried by the arm and located upon the windward side of the wheel; and a vane carried by the arm upon the windward side of the wheel to turn the same on its horizontal axis to adjust the sail area presented to the wind.

6. The combination in a windmill of a standard; a driving-shaft; a bevel gear-wheel thereon; a housing therefor; a connecting-shaft supported by the standard and entering the housing and stepped in the bottom thereof; an arm connected to the standard by a universal joint; a wind-wheel carried thereby and embodying sails set at an angle to its plane of rotation; a shaft therefor geared to the connecting-shaft by a universal train of gear; a second wind-wheel having sails set at an angle opposite to that at which the sails of the first wheel are set; a tubular shaft carrying the same and surrounding the shaft of the other wheel; a tubular connecting-shaft in the standard surrounding the first-mentioned connecting-shaft and geared by a universal train of gear to the shaft of the second-mentioned wind-wheel; a bearing in the housing for the tubular connecting-shaft; bearings in such tubular connecting-shaft for the other connecting-shaft; and a bevel-gear on each of said connecting-shafts in gear with that on the driving-shaft.

7. The combination in a windmill of a standard; a driving-shaft; a bevel gear-wheel thereon; a housing therefor; a connecting-shaft supported by the standard and entering the housing and stepped in the bottom thereof; an arm connected to the standard by a pair of joints having respectively a horizontal and a vertical axis; a wind-wheel carried thereby and embodying sails set at an angle to its plane of rotation; a shaft therefor geared to the connecting-shaft by a universal train of gear; a second wind-wheel having sails set at an angle opposite to that at which the sails of the first wheel are set; a tubular shaft carrying the same and surrounding the shaft of the other wheel; a tubular connecting-shaft in the standard surrounding the first-mentioned connecting-shaft and geared by a universal train of gear to the shaft of the second-mentioned wind-wheel; a bearing on the housing for the tubular connecting-shaft; bearings in such tubular connecting-shaft for the other connecting-shaft; a bevel-gear on each of said connecting-shafts in gear with that on the driving-shaft; a vane carried by the arm between the wheel and the joint to turn the arm on its vertical axis to hold the wheels in the wind; and a vane transverse thereto carried by the arm to turn the arm on its horizontal axis to automatically control the sail area presented to the wind.

8. A windmill having in combination a wheel provided with sails to receive a current of air; an arm pivoted upon a horizontal axis to carry the wheel; shafting to be driven thereby; a lifting-vane connected to the wheel to shift the same to vary the sail area presented to the current of air; and a connection in the shafting to permit such shifting of the wheel, comprising a train of gear-wheels one of which has the line of its axis coincident with the line of said horizontal axis.

9. A windmill having in combination a standard; one member of a gear-housing carried thereby; a shaft carried by the standard; a bevel-gear on the shaft and in the housing; a wind-wheel; a shaft on which the wheel is fast; an arm carrying the same; the other member of the housing carrying said arm and pivoted by a horizontal axis to the first member of the housing; a bevel-gear on said wheel-shaft; a bevel-wheel having its axis on the line of said horizontal axis and in mesh with said former bevel-gears; and wind-controlled means to turn the arm on its axis.

10. A windmill having in combination a support; a transversely-disposed shaft; a pair of bevel-gears on said shaft one of which is loose; a pair of shafts carried by the support and one within the other; a pair of bevel-gears on the respective shafts and at one side of the transverse shaft and in mesh therewith; a pair of oppositely-rotatable wind-wheels; shafts one within the other on which the wheels are fast; bevel-gears on the respective shafts and in mesh respectively with the bevel-gears on the transverse shaft and both at the same side thereof; and means to turn the wind-wheels on the axis of the transverse shaft.

Signed at Nos. 9 to 15 Murray street, New York, N. Y., this 14th day of September, 1903.

ALFRED FORNANDER.

Witnesses:
CHAS. L. RUSSELL,
JOHN O. SEIFERT.